(12) United States Patent
Schmidt

(10) Patent No.: US 7,059,986 B2
(45) Date of Patent: Jun. 13, 2006

(54) ELECTRICALLY VARIABLE TRANSMISSION

(75) Inventor: Michael R. Schmidt, Carmel, IN (US)

(73) Assignee: General Motors Corporation, Detroit, MI (US)

(*) Notice: Subject to any disclaimer, the term of this patent is extended or adjusted under 35 U.S.C. 154(b) by 131 days.

(21) Appl. No.: 10/901,723

(22) Filed: Jul. 29, 2004

(65) Prior Publication Data
US 2006/0025261 A1 Feb. 2, 2006

(51) Int. Cl.
F16H 3/72 (2006.01)

(52) U.S. Cl. .............. 475/5; 475/4; 475/6; 475/8; 475/317; 475/318; 180/65.2; 180/65.3; 903/908; 903/909; 903/911; 903/925

(58) Field of Classification Search .......... 475/4, 475/5, 6, 8, 317, 318; 180/65.2, 65.3, 53.1; 903/908, 909, 911, 925
See application file for complete search history.

(56) References Cited

U.S. PATENT DOCUMENTS

| | | | | |
|---|---|---|---|---|
| 4,579,019 A | * | 4/1986 | Gabriele | 475/5 |
| 5,730,676 A | * | 3/1998 | Schmidt | 475/5 |
| 5,931,757 A | * | 8/1999 | Schmidt | 475/2 |
| 5,935,035 A | * | 8/1999 | Schmidt | 475/5 |
| 6,090,005 A | * | 7/2000 | Schmidt et al. | 475/5 |
| 6,358,173 B1 | * | 3/2002 | Klemen et al. | 475/5 |
| 6,551,208 B1 | * | 4/2003 | Holmes et al. | 475/5 |
| 6,662,890 B1 | * | 12/2003 | Schmidt | 180/65.3 |
| 6,827,165 B1 | * | 12/2004 | Schmidt | 180/65.2 |
| 6,953,409 B1 | * | 10/2005 | Schmidt et al. | 475/5 |

* cited by examiner

Primary Examiner—Charles A. Marmor
Assistant Examiner—Justin K. Holmes
(74) Attorney, Agent, or Firm—Christopher DeVries

(57) ABSTRACT

A powertrain having a fuel cell prime mover, an electronic control unit, two motor/generator units, two planetary gearsets, and a plurality of torque-transmitting mechanisms is operable to provide three ranges of operation. During one range of operation, the power take-off unit operates at a constant speed. During the second range of operation, the power take-off unit, one of the motor/generator units, and the output shaft operate at a same speed, and during the third range of operation, both motor/generator units, the output shaft, and the power take-off unit operate at a same speed.

3 Claims, 3 Drawing Sheets

US 7,059,986 B2

ELECTRICALLY VARIABLE TRANSMISSION

TECHNICAL FIELD

This invention relates to electrically variable transmissions and, more particularly, to electrically variable transmissions having only a fuel cell as the prime source of energy.

BACKGROUND OF THE INVENTION

In most electrically variable transmissions, an internal combustion power plant is combined with an electrical source of power, such as batteries, to operate an electrically variable transmission. The electrically variable transmission (EVT) generally includes at least one motor/generator and usually two motor/generators, which are operable connected through planetary gear mechanisms to a transmission output. The power supplied between a transmission input and the output from both a prime mover, such as an internal combustion engine, and the motor/generator units.

As a general rule with such EVTs, a power take-off unit, which drives accessories, such as fans and pumps, receives power from the internal combustion engine. In at least one EVT, shown in U.S. Ser. No. 10/364,171, filed Feb. 11, 2003, and assigned to the assignee of the present application, a fuel cell and batteries are the sole prime movers for the EVT. In that patent application, the power take-off unit is driven at a constant speed during high transmission output speed. The power take-off unit is driven at variable speeds during lower transmission output speeds. The speed of the power take-off unit is minimum at zero vehicle speed.

SUMMARY OF THE INVENTION

It is an object of the present invention to provide an improved electrically variable transmission having two electrical drive units, a fuel cell prime mover and a power take-off unit.

In one aspect of the present invention, the power take-off unit is driven at a constant speed from zero vehicle speed up to a predetermined speed.

In another aspect of the present invention, the power take-off unit is driven equal to the output speed of the transmission following the predetermined speed.

In a further aspect of the present invention, one electrical drive unit, the transmission output, and the power take-off unit are equal in speed at a predetermined speed point of the vehicle.

In yet a further aspect of the present invention, both electrical drive units, the power take-off unit, and the transmission output rotate at a same speed when the vehicle speed is above a predetermined speed.

DESCRIPTION OF THE EXEMPLARY EMBODIMENTS

Figure 1:
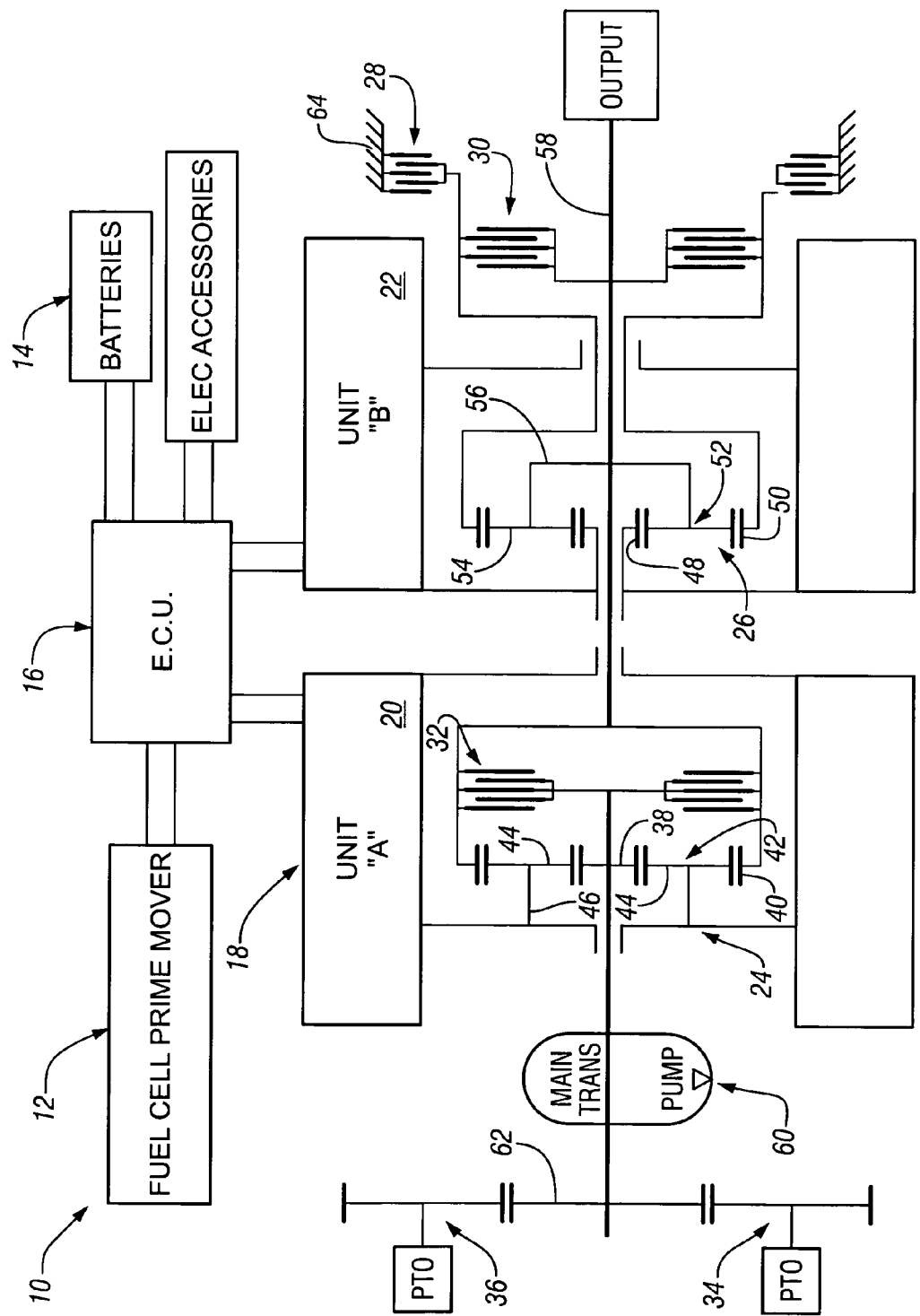
FIG. 1 is a schematic representation of a powertrain embodying the present invention.

FIG. 1 depicts an electromechanical powertrain 10 having a fuel cell prime mover 12, a conventional electric storage unit or batteries 14, an electronic control unit (ECU) 16, and an electrically variable transmission (EVT) 18. The EVT 18 includes two electrical power transfer units such as motor/generator (M/G) units 20 and 22, two planetary gearsets 24 and 26, three selectively engageable clutch or torque-transmitting mechanisms 28, 30, and 32, and a pair of power take-off drives 34 and 36. The M/G units 20 and 22 are conventional motor/generator sets, which are well known in the art. The ECU 16 is a conventional electronic control system including a programmable digital computer, which is capable of controlling the flow of electrical energy from the fuel cell 12 and electrical storage unit 14 to and from the M/G units 20 and 22. The ECU is also connected to operate electrical accessories.

The planetary gearset 24 includes a sun gear member 38, a ring gear member 40, and a planet carrier assembly member 42. The planet carrier assembly member 42 includes a plurality of pinion gears 44 rotatably mounted on a carrier structure 46, which is drivingly connected continuously with the M/G unit 20.

The planetary gearset 26 includes a sun gear member 48, a ring gear member 50, and a planet carrier assembly member 52. The planet carrier assembly member 52 includes a plurality of pinion gears 54 rotatably mounted on a carrier structure 56. The sun gear member 48 is continuously drivingly connected with the M/G unit 22.

The ring gear member 40 and the carrier 56 are drivingly connected with a transmission output shaft 58. The sun gear member 38 is drivingly connected with a conventional hydraulic pump 60 and with a drive gear 62, which in turn is drivingly connected to the power take-off drives 34 and 36.

The selectively engageable torque-transmitting mechanism 28 is engageable between a transmission housing or stationary member 64 and the ring gear member 50. The selectively engageable torque-transmitting mechanism 30 is engageable between the transmission output shaft 58 and the ring gear member 50. The selectively engageable torque-transmitting mechanism 32 is engageable between the ring gear member 40 and the sun gear member 38.

Selective engagement of torque-transmitting mechanism 32 will cause the planetary gearset 24 to operate in a 1:1 ratio, such that the drive gear 62, the pump 60, and the M/G unit 20 operate at the same speed. The engagement of the torque-transmitting mechanism 28 will result in grounding of the ring gear member 50, such that the output shaft 58 will be driven at a reduced speed determined by the speed ratio of the planetary gearset 26 and the speed of the M/G unit 22. The engagement of the torque-transmitting mechanism 30 results in the planetary gearset 26 being placed in a 1:1 ratio, such that the M/G unit 22 and the output shaft 58 will rotate at the same speed. It will be noted that when both torque-transmitting mechanisms 30 and 32 are engaged, the M/G units 20 and 22, as well as the drive gear 62 and the output shaft 58, will rotate in unison.

Figure 3:
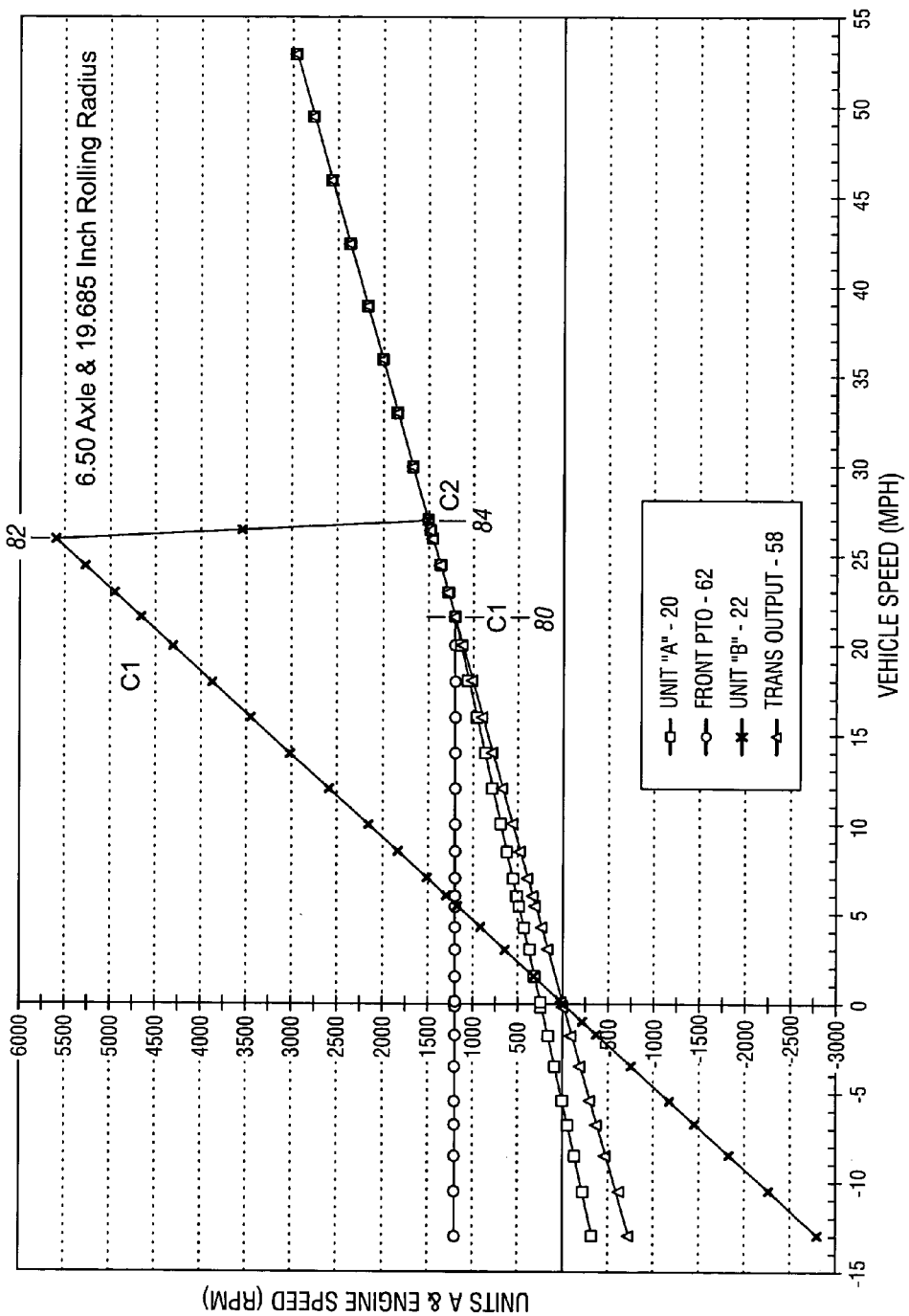
FIG. 3 is a plurality of curves depicting the speed of components within the powertrain versus vehicle speed.

Referring to FIG. 3, it will be noted that when the vehicle speed is zero, the speed of M/G unit 22 is zero while the speed of M/G unit 20 is slightly above zero. Rotation of the M/G unit 20 and the stationary condition of the ring gear member 40 (output shaft 58 is zero), the sun gear member 44 is overdriven through the planetary gearset 24 such that the speed of the drive gear 62 is elevated as shown. As it is desired to move the vehicle in either a forward or reverse direction, the torque-transmitting mechanism 28 is engaged and the speed of the M/G units 20 and 22 are increased positively or negatively, which results in a positive or a negative rotation of the output shaft 58. Also when the speed of the vehicle is adjusted from the zero speed to forward or reverse, the speed of the M/G unit 20 is changed in a positive direction or in a negative direction.

As the speed of the M/G units 20 and 22 increase in a positive direction, the output shaft 58 of the transmission also increases in a positive direction; however, due to the gearing relationship of planetary gearset 24, the power take-off speed is constant from the zero speed to a point 80 on the speed curve. At the point 80, the speed of the drive gear 62, the M/G unit 20, and the output shaft 58 are equal such that the torque-transmitting mechanism 32 is engaged synchronously. That is, there is no slippage between the input and output members of the torque-transmitting mechanism 32.

By further increasing the vehicle speed, the transmission operation reaches a point 82 at which point the torque-transmitting mechanism 28 is disengaged and the M/G unit 22 is decreased in speed from the point 82 to a point 84. The speed change or transition between these points is controlled to be completer within approximately five seconds by the ECU 16 until the speed of the M/G unit 22 is equal to the speed of the M/G unit 20, the drive gear 62, and the output shaft 58. Thus, at point 84, the torque-transmitting mechanism 30 is engaged synchronously. Following the engagement of the torque-transmitting mechanism 30 and the continued engagement of the torque-transmitting mechanism 32, the M/G units 20, 22, the drive gear 62, and output shaft 58 rotate in unison for the remainder of the vehicle operation. During the transition between points 82 and 84, the M/G 20 will operate under a transient power condition. Under this condition all the power will go through M/G 20 which will drive both the PTO and the vehicle propulsion without any loss in output torque during the transition period. The M/Gs 20 and 22 are capable of transferring twice their continuous power rating for about ten seconds under transient conditions.

As the vehicle is driven in reverse, it will be noted that the speed of M/G unit 20 reduces from the idle value to zero at approximately six miles per hour. During this speed range, the M/G unit 20 operates as a generator and supplies electrical energy back to the system and accordingly provides the controlled speed at the carrier 46, such that the output speed at the ring gear member 40 drives the drive gear 62 and it is as noted, driven at a constant speed. Following of the reaching of the zero speed point for M/G unit 20 and further increasing the speed in the reverse speed, the M/G unit 20 rotates negatively relative to the input direction and further increases the speed of the output shaft 58; however, the drive gear 62 continues to rotate at a constant speed. The speed of the drive gear 62 is determined, as previously mentioned, by the gearing mechanism of the planetary gearset 24.

As the vehicle operates between the maximum reverse speed and the point 80, the drive gear 62 is generally rotating at a sufficient speed to supply all of the energy necessary to operate the devices within the vehicle and the powertrain, such as fans and other accessories. As the vehicle speed increases at the point 80, the requirements for the drive gear 62 increase, such that the speed of the drive gear 62 is increased. This is significantly different from prior art mechanisms wherein the drive gear had a substantially variable speed around the zero point in both the positive and negative direction until reaching a predetermined value after which the drive gear speed would be held constant.

Figure 2:
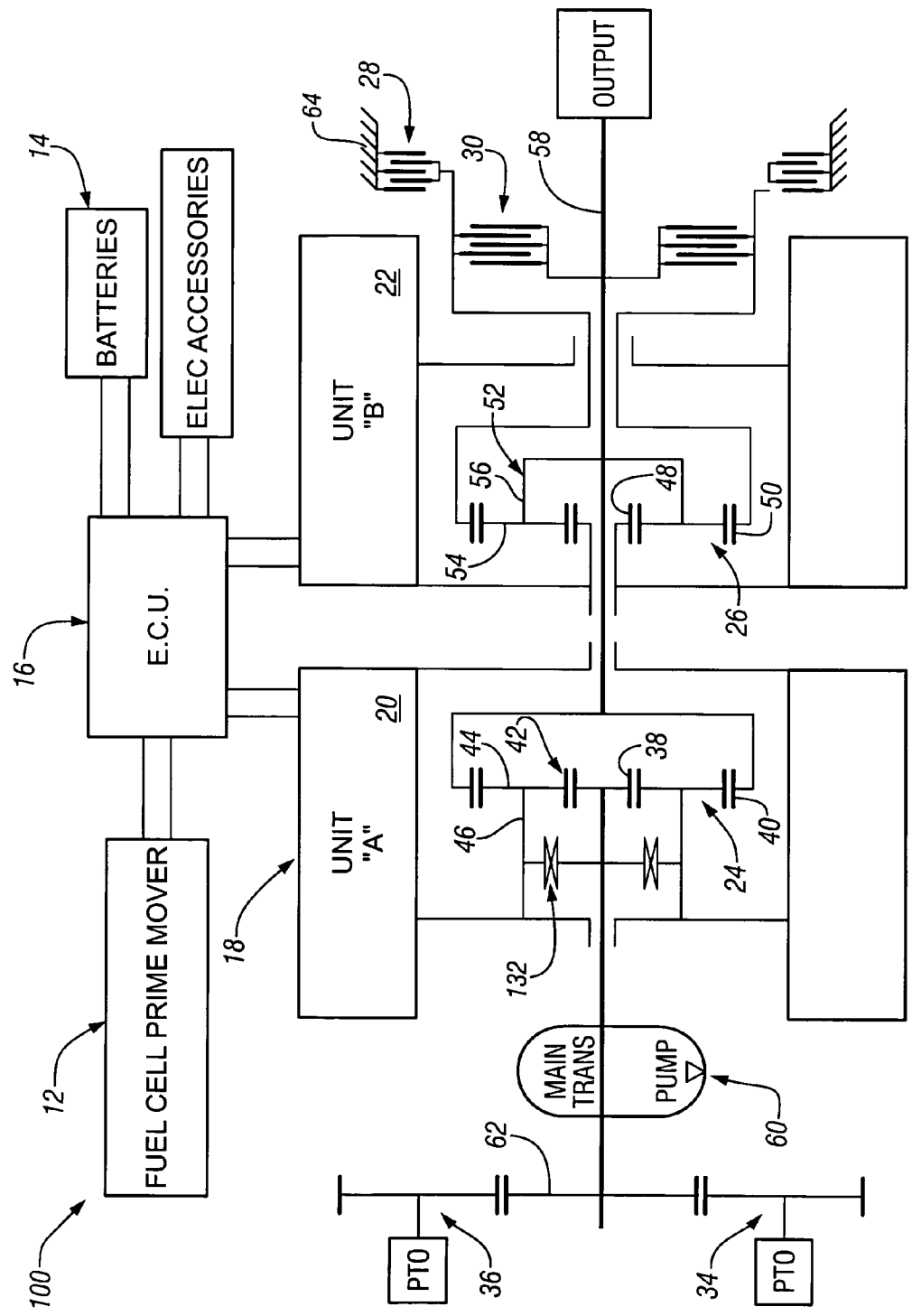
FIG. 2 is a schematic representation of an alternative embodiment of a powertrain incorporating the present invention.

A powertrain 100 shown in FIG. 2 is substantially identical with the powertrain 10 shown in FIG. 1. The only difference between the two powertrains is the use of a one-way torque-transmitting mechanism 132 in place of the frictional torque-transmitting mechanism 32. The torque-transmitting mechanism 132 will operate such that the point 80 on the curve of FIG. 3 will be reached automatically when the speed of the M/G unit 20 attempts to rotate faster than the speed of the drive gear 62. Thus, the interchange at point 80 becomes a one-way torque-transmitting mechanism interchange such that the engagement and disengagement of the torque-transmitting mechanism 32 will not be employed. Otherwise, the powertrain 100 operates the same as the powertrain 10 and will utilize the same speed ratio curves shown in FIG. 3.

The invention claimed is:

1. An electromechanical powertrain including a transmission comprising:

a fuel cell power source;

an electrical energy storage means;

an electronic control unit connected between said fuel cell power source and said electrical energy storage means;

a transmission output shaft;

a transmission housing;

a first electrical power transfer machine electrically connected with both said fuel cell power source and said electrical energy means through said electronic control unit;

a second electrical power transfer machine electrically connected with both said fuel cell power source and said electrical energy means through said electronic control unit;

power take-off means for supplying power to operate accessories;

a first planetary gearset having a first member continuously rotatable with said first electrical power transfer machine, a second member continuously rotatable with said output shaft, and a third member continuously rotatable with said power take-off means;

a second planetary gearset having a first member continuously rotatable with said second electrical power transfer machine, a second member continuously rotated with said second member of said first planetary gearset and with said output shaft, and a third member;

a first torque-transmitting mechanism selectively connectable between said transmission housing and said third member of said second planetary gearset;

a second torque-transmitting mechanism selectively connectable between said third member of said second planetary gearset and said output shaft;

a third torque-transmitting mechanism selectively connectable between said third member and said second member of said first planetary gearset to provide a 1:1 drive from said first electrical power transfer machine to said power take-off means; and said first torque-transmitting mechanism being engaged for a first range of operation, said second torque-transmitting mechanism being engaged for a second range of operation, and said third torque-transmitting mechanism being engaged to cause unitary rotation of said first electrical power transfer machine, said power take-off means and said output shaft, and operating in cooperation with the engagement of said second torque-transmitting mechanism to cause conjoint rotation of said first electrical power transfer machine, said second electrical power transfer machine, said power take-off means, and said output shaft.

2. The electromechanical powertrain including a transmission defined in claim 1 further comprising:
said third torque-transmitting mechanism comprising a one-way torque-transmitting mechanism disposed between said first electrical power transfer machine and said power take-off means.

3. The electromechanical powertrain including a transmission defined in claim 1 further comprising:
said first member of said first planetary gearset being a planet carrier member, said second member of said first planetary gearset being a ring gear member, and said third member of said first planetary gearset being a sun gear member; and
said first member of said second planetary gearset being a sun gear member, said second member of said second planetary gearset being a planet carrier member, and said third member of said second planetary gearset being a ring gear member.

* * * * *